Sept. 1, 1964 A. A. HAGSTROM 3,146,928

TAPE LID

Filed Oct. 17, 1962

INVENTOR
ARTHUR A. HAGSTROM

BY [signature]

ATTORNEY

United States Patent Office 3,146,928

Patented Sept. 1, 1964

3,146,928
TAPE LID

Arthur A. Hagstrom, Hoffman Estates, Ill., assignor to Teletype Corporation, Skokie, Ill., a corporation of Delaware Filed Oct. 17, 1962, Ser. No. 231,196
10 Claims. (Cl. 226—83)

This invention relates to tape lids for tape sensing devices and more particularly to a tape lid for positioning and holding a tape being sensed by sensing pins of a tape reader.

In the prior art tape sensing devices, the tape lids are of multipiece construction and are secured to the tape bearing plate of the tape sensing device by a hinge pin extending through a leaf of the hinge on the tape lid and through a leaf of the hinge secured to the tape bearing plate of the tape sensing device. The use of a conventional hinge to secure a tape lid to the tape sensing device necessitates an initial accurate positioning and alignment of the hinge relative to the tape lid and the tape sensing device. Play and wear within the hinge also necessitate a periodical readjustment of the tape lid to assure the proper positioning of a tape slot in the tape lid relative to the tape sensing pins.

Accordingly, an object of the invention is to provide a new and improved tape lid for obviating these and other deficiencies of other prior art tape lids.

Another object of the invention is to provide a new and improved tape lid comprising one integral element.

A further object of the invention is to provide a tape lid of one-piece construction preferably of plastic having locating surfaces thereon for engagement with the plate of a tape sensing device to precisely locate the tape lid relative to the tape sensing pins.

A still further object of the invention is to eliminate the problems of tolerances and adjustments necessitated by a normally effective tape lid hinge by making the hinge ineffective while the tape lid is in guiding relationship with a top plate of a tape sensing device.

Another object of the invention is to mount a tape lid on a top plate of a tape sensing device without a conventional hinge and to have means on the tape lid and top plate operable to constitute a tape lid hinge.

Yet another object of the invention is to provide a tape lid having a pivot means formed integrally thereon that is out of engagement with a bearing means therefor on the top plate when the tape lid is in a tape guiding position and that is capable of movement into engagement with the bearing means to act as a hinge during a rotation of the tape lid.

A feature of the invention is to provide a tape lid having locating surfaces that are spring biased into engagement with locating surfaces on the top plate and having an ineffective pivot means thereon that does not interfere with the locating of tape lid on the top plate.

According to the preferred embodiment of the invention, a tape sensing device has mounted thereon a tape lid having integrally formed cylindrical pivot pins at one end and a latching surface at its other end. Disposed intermediate the ends of the tape lid is a tape guiding slot in the tape lid for orienting the tape in proper relationship to the top plate and for resisting the upward movement of the tape by the sensing pins during a tape sensing operation. A pair of spaced locating surfaces on said tape lid vertically locate the bottom of the tape slot relative to the top plate. A pair of spaced vertical projections carried on the tape lid enter aligned holes on the top plate to center the tape lid in both the lateral and longitudinal directions. A spring biased latch pawl wedgingly engages a latching surface on the tape lid to latch the tape lid in its tape guiding position thereby holding the tape lid from moving its pivot pins into the bearing block on the top plate against the urging of a return spring secured between the tape lid and the tape sensing device.

Other features and advantages of the invention will become apparent from the following description when considered in conjunction with the drawings wherein.

Figures 1, 2, 3, 4:
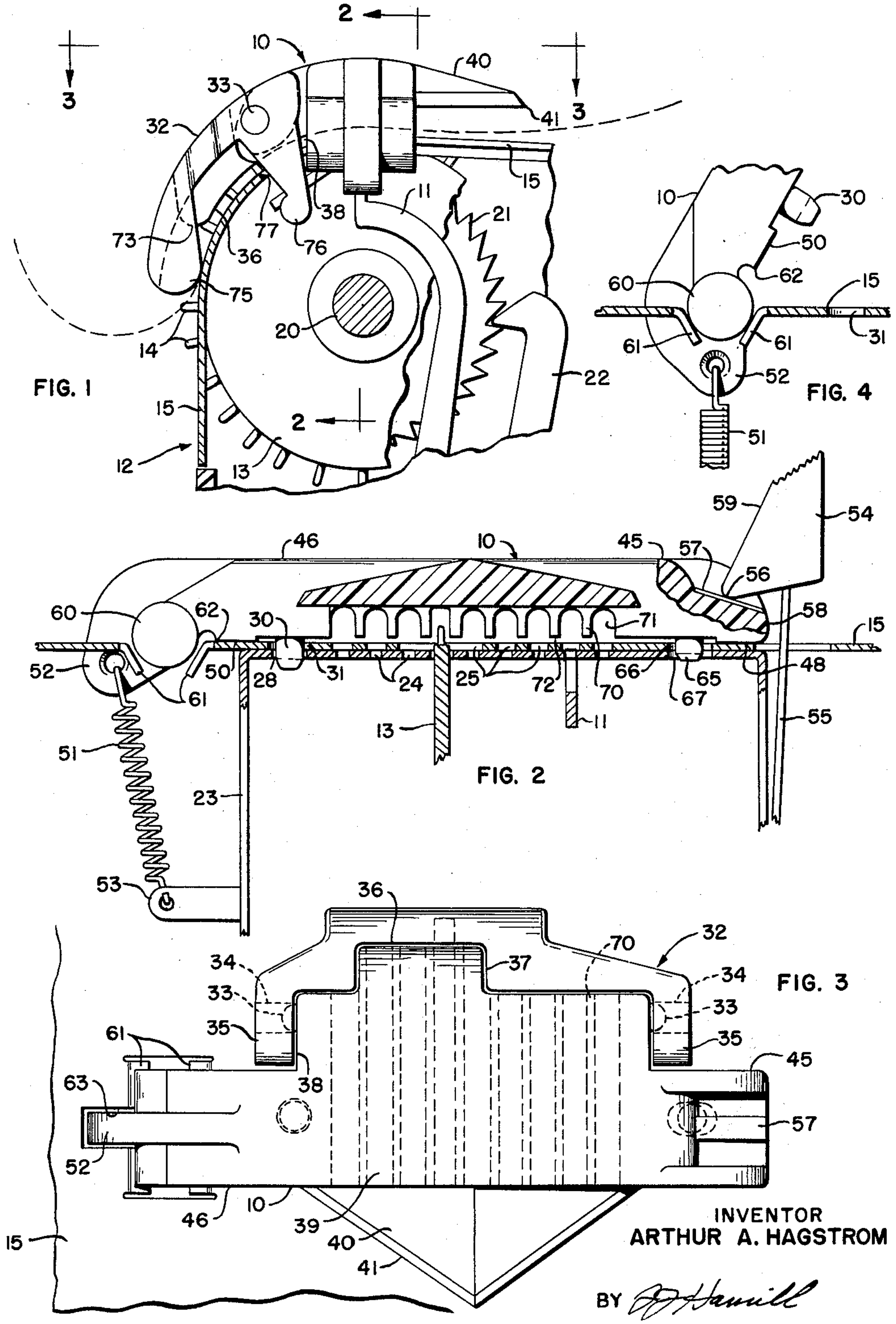
FIG. 1 is an end view showing the tape lid in its closed position upon the top plate of a tape sensing device according to the preferred embodiment of the invention.
FIG. 2 is a cross-sectional view of the tape lid taken substantially along the line 2—2 of FIG. 1 in the direction of the arrow showing the tape lid latched into engagement with the top plate of a tape sensing device.
FIG. 3 is a plan view of the tape lid taken along the line 3—3 in FIG. 1 in the direction of the arrows.
FIG. 4 is a sectional view showing the cylindrical pivot pins of the tape lid in pivoting relationship with shear tabs forming a bearing means therefor according to the preferred embodiment of the invention.

Referring now to the drawings and in particular to FIG. 1, there is shown a tape lid 10 for guiding a recording medium, preferably paper tape, during a tape sensing operation by a tape sensing pin 11 of a tape reader 12. The tape reader 12, upon which the tape lid 10 is shown herein, is preferably the tape reader described and illustrated in the copending application of Anderson-Hagstrom-Thienemann, Serial No. 231,199, filed of even date herewith. As will be apparent from the following description, the tape lid 10 can be used with other types of tape sensing devices than that of the above-identified copending application and the tape lid is not limited to use with any particular type of tape sensing device.

The tape reader 12 has the usual feed wheel 13 having tape feeding pins 14 for engaging the tape feed holes in the paper tape passing between the lid 10 and a top plate 15. The feed wheel 13 is secured to a shaft 20 and rotates with the shaft 20 to feed the tape through the tape reader 12 from left to right in FIG. 1 as a ratchet feed wheel 21 is rotated by a ratchet pawl 22 during each sensing cycle of the tape reader 12.

A top plate 15 serves as an outside cover for the tape reader 12 and is secured in a suitable fashion, such as, by spot welding to a top plate bracket 23. The top plate bracket 23 has eight sensing pin holes 24 therein through which the sensing pins 11 (only one of which is shown, the remaining seven being omitted so that the tape lid might be more clearly illustrated) may move upwardly through overlying and enlarged sensing pin holes 25 in the top plate 15. The sensing pins 11 detect a perforation or the lack thereof in the paper tape passing between the tape lid 10 and the top plate 15. It should be noted that the sensing pin holes 24 in the top plate bracket are smaller than the sensing pin holes 25 in the top plate 15 and hence the holes 24 serve to guide the tape sensing pins whereas the sensing pin holes 25 in the top plate 15 do not guide the sensing pins but merely serve as a cover for the top plate bracket 23. For the same reason, a locating hole 28 in top plate bracket 23 for a locating pin 30 of the tape lid 10 is of smaller dimensions than is the aligned hole 31 in top plate 15 superimposed over locating hole 28 in top plate bracket 23.

The locating pin 30 is integrally formed on the tape lid 10 and the tape lid 10 is of one-piece integral construction preferably fabricated by molding a transparent plastic. A taut-type bail 32, which does not constitute a part of the tape lid 10, is pivoted on the tape lid 10 and is also of one-piece, plastic construction. As seen in FIG. 3, a pair of opposed ears 33 formed on the tape lid 10 are inserted into apertures 34 in arms 35 of taut-tape bail 32 and serve as pivot pins for the taut-tape bail 32. The arms 35 are of narrow cross-section and are spaced sufficiently far apart, as seen in FIG. 3, so as to be sufficiently deflectable to be snapped over the ears 33 on the tape lid 10 so that the taut-tape bail 32 can be readily removed from pivotal connection with the tape lid 10.

The general outline of the tape lid 10 is best seen from the plan view of FIG. 3 wherein the tape lid is shown having a narrow projecting tape guiding portion 36 fitting within a matching recess 37 formed in the taut-tape bail 32. As seen in the end view (FIG. 1), the tape guiding projection 36 curves downwardly adjacent the curved portion of the top plate 15. The curvature of the top plate 15 and tape guiding projection 36 is substantially about the axis of the feed wheel 13, and hence wraps the paper tape about this axis and holds the tape against this curved portion of the tape plate 15 so that a plurality of feed wheel pin 14 are inserted through the feed holes in the tape.

The narrow projecting tape guiding portion 36 projects outwardly from a wider projecting portion 38 which has the ears 33 for the taut-tape bail 32 extending laterally outward therefrom. A main body portion 39 of the tape lid 10 has an arrow-shaped projection 40 extending outwardly therefrom and the arrow-shaped projection 40 indicates the direction in which the tape is leaving the tape reader 12. The outer edge of the arrow-shaped projection 40, as seen in FIG. 1, constitutes a tearing edge 41 against which a previously sensed portion of a piece of perforated tape may be lifted and torn to separate it from the tape in the reader 12. This torn piece of paper tape will, of course, have configuration of an arrow at its end to indicate the direction of travel of the tape.

As viewed in FIG. 3, the main body portion 39 has a laterally extending latching portion 45 integrally formed on the right end thereof and a laterally extending pivoting portion 46 extending from the left end thereof. To properly locate the tape lid 10 in the vertical direction, the latching portion 45 of the tape lid has a flat locating surface 48 in engagement with the top plate and the pivoting portion 46 of the tape lid 10 has a flat locating surface 50 in engagement with the top plate 15.

With the tape lid 10 in the position shown in FIG. 2, the locating surface 50 is pressed against the top plate 15 under the urging of a return spring 51 secured between an end portion 52 of the tape lid 10 and a tab 53 extending laterally from the top plate bracket 23. The opposed locating surface 48 is also spring pressed against the top plate 15 by a latch 54 mounted on a leaf spring 55 secured to the tape reader 12. The latch 54 has a nose 56 in engagement with an inclined latching surface 57 on the tape lid 10. Since the leaf spring 55 is biased to the left, as viewed in FIG. 2, the nose 56 exerts a downwardly directed force on inclined latch surface 57 as the nose 56 tends to move up the inclined surface 57 when the leaf spring 55 tries to move to the left. It should be noted that the nose 56 and inclined surface 57 produce a wedging action due to the inclination of their surfaces that latches the tape lid 10 to the top plate 15 against the rotational torque being exerted upon the tape lid 10 by the return spring 51.

To avoid the necessity of an operator's manipulating the latch 54 to move it to the right in FIG. 2 as the tape lid 10 is being rotated to its closed position, the tape lid 10 is provided with an outer camming nose 58 at its lateral extremity for camming engagement with an inclined surface 59 on the latch 54. The inclination of the inclined surface 59 is such that the camming nose 58 on the tape lid 10 readily moves latch 54 to the right as it moves in a downward and arcuate direction.

The return spring 51 not only serves to urge the locating surface 50 against the top plate 15 but also functions to urge a pair of opposed, integrally formed cylindrical pivot pins 60 on the tape lid 10 to move downwardly into engagement with downwardly inclined shear tabs 61 formed in top plate 15. The shear tabs 61 are formed by punching the top plate 15. As seen in FIG. 2, the cylindrical pivot pins 60 are spaced from the shear tabs 61 when the tape lid 10 is latched into its tape guiding position by the latch 54 and hence the pivot pins 60 and shear tabs 61 do not form any part of the locating means for the tape lid 10 while it is in its tape guiding position.

The return spring 51 exerts a rotational torque on the tape lid 10 so that when the latch 54 is moved to the right as viewed in FIG. 2 the tape lid 10 initially pivots about the edge 62 of the locating surface 50 as it rotates in the counterclockwise direction under the urging of spring 51. After a slight counterclockwise rotation about the pivot edge 62, the pivot pins 60 move into engagement with the shear tabs 61 and the pivot pin 60 and the shear tabs 61 thus comprise a hinge means about which the tape lid 10 continues to rotate to its open position. In its open position (FIG. 4), the spring 51 no longer exerts a force on the tape lid 10 to rotate it further in the counterclockwise direction since the return spring 51 is now aligned with the pivot pins 60 in the vertical direction. The spring 51 will retain the tape lid 10 in this open position until an operator rotates the tape lid 10 in a clockwise direction, whereupon after most of the rotation has been completed, the pivot edge 62 will again engage the top plate 15 and serve as a pivot point until the flat locating surfaces 50 and 48 are in contact with the top plate 15 at which time further rotation is not possible.

To stabilize the tape lid 10 when it is in its open position, the end portion 52 of the tape lid 10 extends laterally outward of the pivot pins 60 and is of narrow cross-section and fits into a narrow slot 63 formed in top plate 15. With the lid in this open position, the end portion 52 will resist attempts to turn the tape lid 10 so that one of the pivot pins would pivot about the other of the pivot pins. With the tape lid 10 in the open position, the pivot pins 60 need only be so aligned that the shear tabs 61 that they will generally guide the tape lid 10 and integrally formed locating pin 30 into the aligned locating holes 31 and 28. After the locating pin 30 enters the locating hole 28, its bullet nose end acts as a camming means to laterally and longitudinally position the tape lid 10 relative to the top plate 15. It should be noted that the cylindrical portion of the locating pin 30 is in engagement with the locating hole 28 in top plate bracket 23 when the lid is closed to accurately hold the tape lid 10 in its proper position on the top plate bracket 23. An opposed locating pin 65 carried on the latching portion 45 of the tape lid moves into guiding slots 66 and 67 formed in the top plate 15 and top plate bracket 23, respectively, and locates, principally in the longitudinal direction, its end portion of the tape lid 10 with respect to the top plate bracket 23.

The principal means for locating the perforated tape is the feed wheel pins 14 on the feed wheel 13 and the tape lid 10 does not serve to locate the tape laterally relative to the sensing pins 11 extending upwardly through the aligned sensing holes 24 and 25 in the top plate bracket and top plate, respectively. The primary function of the tape lid 10 is to hold the tape against upward movement by the sensing pins 11 as they engage the unperforated areas of the tape normally associated with the spacing condition. As seen in FIG. 2 the tape will be moved upwardly by the tape sensing pins into engagement with the bottom portions 72 of lands 70, adjacent ones of which, form therebetween chad guiding slots 71 for the chad of chadless tape, i.e., the hinged lids of tape that are formed in a tape when cut by punches that only partially sever the chad or chip from the tape. While the tape lid 10 and lands 70 do not guide the tape in the lateral direction, they, nonetheless must be accurately positioned both in a lateral and a longitudinal direction to prevent excessive contact and rubbing of the chad of chadless tape against the lands 70 that would cause an excess drag on the tape as it moves beneath the tape lid 10.

The slots 71 and lands 70 are accurately dimensioned from and located with respect to the locating pin 30. Since the locating hole 28 in top plate bracket 23 and the feed wheel 13 are accurately located on the top plate bracket 23 and since the feed wheel pins 14 laterally locate the tape, the locating pin 30 is able to precisely position the lands 70 and tape slots 71 relative to the tape so as not to interfere with the chad of the chadless tape.

In addition, as seen in FIG. 3, the lands 70 extend longitudinally along the entire length of the tape lid 10 and are curved about the axis of the feed wheel 13 in the narrow tape guiding projecting portion 36 and the wider projecting portion 38 of the tape lid 10. Hence, the bottom surfaces 72 of the lands 70 must be and are accurately spaced from the top plate 15 in the vertical direction by locating surfaces 48 and 50 in order to permit the tape to pass between the curved portions of the tape lid 10 and the top plate 15. To facilitate the passage of the tape through this area the curvature of the lands 70 in the narrow projecting portion 36 of the tape lid 10 is of a slightly larger radius than that of the wider projecting portion 38 of the tape lid 10 thereby assuring that the tape enters more freely through the guiding nose 73 (FIG. 1) of the tape lid 10.

The tape entering under the tape lid 10 is normally looped downwardly and enters under a rounded tape engaging portion 75 of the taut-tape bail 32 which rides on the tape. The taut-tape bail 32 extends in a generally downward direction when the tape is being freely supplied to the tape reader 12. However, when the tape is no longer being freely supplied, for instance, when the tape supply has been depleted from a reel that holds the trailing end of the tape or when the loop of tape is depleted and the tape becomes taut, an increased tension and/or tautness results in the tape to take up the loop of tape and the rounded tape engaging portion 75 will rotate in a clockwise direction as seen in FIG. 1 about the ears 33 on the tape lid 10 and rotate a dependent lever 76 extending through a slot 77 in the top plate 15. Upon sufficient rotation of the taut-tape bail 32 and the dependent lever 76, another lever (not shown) is operated to signify to the tape reader that a taut-tape condition has occurred whereupon the tape feeding is stopped to prevent tearing of the tape.

The operation of the tape lid 10 can best be understood from the folllowing brief discussion thereof.

With the tape lid 10 in the open position shown in FIG. 4, the cylindrical pivot pins 60 are in engagement with the shear tabs 61 formed in the top plate 15 and the tape lid exposes the sensing pin holes 25 in the top plate and the tape feeding pins 14. The end portion 52 of the tape lid to which the spring 51 is attached has rotated so that the contractile spring 51 is in vertical alignment with the center of the pivot pins 60. With the tape lid in this position a piece of tape can either be placed on the top plate 15 or can be removed from the top plate 15.

In normal operation the leading end of the perforated tape to be read is wrapped about the top plate 15 and a plurality of the feed wheel pins 14 extend through the feed hole perforations in the tape. A rotation of the tape lid in the clockwise direction inserts locating pin 30 into locating hole 28 as the pivot point 62 comes into engagement with the top plate 15. Further rotation of the tape lid 10 lifts the pivot pins 60 from the shear tabs 61 and brings its camming nose 58 into engagement with the inclined surface 59 on the latch 54. As the latch 54 is cammed outward, the locating pin 65 moves into the guiding slot 67. As the locating pins 30 and 65 move further into their locating holes they shift the lid 10 to locate it in the lateral and longitudinal directions and about the axis of the feed wheel. When the camming nose 58 is rotated below the nose 56 of the latch 54, the latch 54 moves to the left under the action of spring 55 and its nose 56 slides into wedging engagement with the inclined latching surface 57 on the tape lid 10.

With the locating surfaces 48 and 50 biased into engagement with the top plate by the downward biasing force imparted to the tape lid by the springs 51 and 55, the bottom surfaces 72 of the chad guiding lands 70 are accurately spaced from the surface of the top plate 15. The guiding slots 71 between the lands 70 are properly spaced in a lateral direction to prevent undue frictional engagement with the chad lids of chadless tape since the locating pin 30 has accurately determined the lateral position of the lands 70 with respect to the top plate 15. The longitudinal alignment of the chad guiding slots 71 also is assured by the engagement with the locating pin 65 in the longitudinal guiding slot 67 in the top plate bracket 23. With these three locating elements held accurately, the narrow projecting portion 36 of the tape lid 10 is accurately spaced from the curved portion of the top plate 15 to prevent binding of the tape moving therebetween.

With the lid thus closed, the pivot pins 60 will be out of engagement with the shear formed tabs 61 and hence do not require any adjustment or close tolerances to hold the tape lid 10 in accurate alignment with the tape and the tape sensing mechanism. If the pivot pins 60 were in effective contact with the shear tabs continuously in the manner of the prior art types of leaf hinge or if a leaf hinge was secured between the top plate 15 and tape lid 10, the contact between the pivot pin and the bearing for the pin would materially affect the alignment of the tape lid. With such a type of normally effective hinge, close adjustment of the hinge pin and bearing therefor is required, making frequent re-adjustments of the hinge necessary to properly align the tape lid. As should be apparent from the foregoing, the use of a normally ineffective hinging means when the tape lid 10 is in its tape guiding positions, not only eliminates an initial accurate alignment of the hinging means but also any further adjustments thereof.

Although only one embodiment of the invention is shown in the drawings and described in the foregoing specification it will be understood that invention is not limited to the specific embodiment described, but is capable of modification and rearrangement and substitution of parts and elements without departing from the spirit of the invention.

What is claimed is:

1. In a tape sensing device, a tape lid for rotatable movement into a tape guiding position relative to a plate on said sensing device and for rotatable movement to an open position affording access to a tape in said tape sensing device which tape lid is of one-piece plastic construction and has a slot therein through which the tape passes over tape sensing pins and which holds the tape in engagement with said plate against the pressure of the sensing pins as they sense the tape, (*a*) projections formed on said tape lid and constituting a pivot support for the lid about which said tape lid rotates during a portion of its movement to and from a tape guiding position, (*b*) means on said plate for engagement by said projections during said portion of the tape lid's movement, said means being spaced from said projections when said tape lid is in said tape guiding position, and (*c*) an edge on said tape lid positioned for cooperation with a surface of said plate to form a pivot about which said tape lid is pivoted during the remainder of its movement to and from a tape guiding position, said edge being positioned to move said projections toward and away from said means during the remainder of said tape lid's movement away from and toward said tape guiding position.

2. In a tape utilization device, a tape lid spanning a tape and having a tape guiding slot therein for holding the tape against a plate on said tape utilization device, (*a*) a first locating surface on said tape lid disposed outwardly of one side of said tape slot for engagement with the top of said plate, said locating surface being positioned a predetermined distance from the surface of the slot which holds the tape against the plate, (*b*) a second locating surface upon said tape lid disposed outwardly of the other side of said tape slot also for engagement with the top of said plate, said second locating surface being positioned a predetermined distance from the surface of the slot which holds the tape against the plate, (*c*) at least one horizontal locating surface on said plate, (*d*) a horizontal locating means on said tape lid for engagement with said horizontal locating surface on said plate to precisely locate the tape lid and slot laterally and longitudinally with respect to the plate, (*e*) a first urging means for interconnecting said tape lid and said tape utilization device and for urging said first locating surface means against said plate, and (*f*) a second urging means for interconnecting said tape lid and said utilization device and for urging said second locating surface against said plate thereby precisely locating the slot in the tape lid vertically with respect to the plate.

3. In a tape utilization device, a tape lid spanning a tape and having a tape guiding slot therein for holding a tape in proper position relative to said tape utilization device, (*a*) a first locating surface on said tape lid disposed outwardly of said tape slot for engagement with the top of said plate, said locating surface being positioned a predetermined distance from the surface of the slot which holds the tape against the plate, (*b*) a second locating surface upon said tape lid disposed outwardly of the other side of said tape slot also for engagement with the top of said plate, said second locating surface being positioned a predetermined distance from the surface of the slot which holds the tape against the plate, (*c*) at least one lateral locating surface on said plate, (*d*) a lateral locating means on said tape lid for engagement with said lateral locating surface on said plate to precisely locate the tape slot laterally and longitudinally with respect to the plate, (*e*) a first urging means for interconnecting said tape lid and said tape utilization device and for urging said first locating surface against said top plate, (*f*) a second urging means for interconnecting said tape lid and said utilization device and for urging said second locating surface against said plate thereby precisely locating the slot in the tape lid vertically with respect to the top plate, (*g*) a hinge for rotating said tape lid toward and away from its tape holding position, said hinge being ineffective when said tape lid is positioned to hold the tape and effective when said tape lid is moving from its tape holding position, said hinge comprising (1) integrally formed cylindrical pivot pins on said tape lid constituting a pivot pin means for said tape lid, and (2) receiving means on said plate for receiving said integrally formed cylindrical pivot pins on said tape lid and for acting as bearing surfaces for said cylindrical pivot pins, and (*h*) guiding means for guiding said integrally formed pivot pins out of and into said receiving means when said tape lid is moving to and from its tape holding position respectively.

4. In a tape utilization device, a tape lid rotatable into tape guiding engagement with a tape engaging plate on said tape utilization device and rotatable to an open position affording access to the tape engaging plate, said tape lid having a tape guiding slot therein for holding the tape against the plate and for guiding the tape about said tape engaging plate, (*a*) a first locating surface on said tape lid disposed outwardly of one side of said tape slot for engagement with the top of said tape engaging plate, said locating surface means being positioned a predetermined distance from the slot which holds the tape against the plate, (*b*) a second locating surface upon said tape lid disposed outwardly of the other side of said tape slot also for engagement with the top of said tape engaging plate, said second locating surface being positioned a predetermined distance from the surface of the slot which holds the tape against the plate, (*c*) at least one lateral locating surface on said plate, (*d*) a lateral locating means on said tape lid for engagement with said lateral locating means on said plate to precisely locate the tape lid and the tape slot laterally and longitudinally with respect to the plate, (*e*) a hinge for rotating said tape into and away from engagement with said tape engaging plate, said hinge comprising (1) integrally formed cylindrical pivot pins on said tape lid spaced upwardly from said tape engaging plate when said first and second locating surfaces are engaging said plate, and (2) receiving means on said plate for receiving said integrally formed pivot pins on said tape lid for pivotal engagement with said receiving means on said plate, (*f*) an edge on said first locating surface for guiding said cylindrical pivot pins into and out of engagement with said receiving means during said tape lid's rotation away from and into engagement with said tape engaging plate respectively, (*g*) an urging means for urging said tape lid from a tape guiding position to a position wherein said pivot pins move into pivotal engagement with said receiving means, said urging means also for urging said tape lid to pivot to an open position, and (*h*) a biased locking means for locking said tape lid against movement to an open position, said biased locking means and said urging means holding said first and second locating surfaces in engagement with said plate thereby precisely locating said slot vertically with respect to said plate.

5. In a tape sensing device having a tape lid for rotatable movement into tape guiding relationship with a plate on said sensing device and for rotatable movement to an open position affording access either for placement of a tape on said plate or for removal of a tape from said plate, said tape lid being of one-piece plastic construction and having a plurality of slots therein through which pass the chad lids of chadless tape and a plurality of lands separating said slots, the bottoms of said lands engaging and holding said tape against the pressure of sensing pins as they sense the tape, (*a*) vertical and horizontal locating surfaces on said plate, (*b*) vertical and horizontal locating surfaces on said tape lid movable, respectively, into operative locating engagement with the vertical and horizontal locating surfaces on said plate, (*c*) integrally formed pivot pins on said tape lid disposed outwardly of the said tape slot and constituting a means about which said tape lid may pivot, said pivot pin cylinders being spaced from said plate when said vertical locating surfaces are in operative locating engagement, (*d*) receiving means on said plate for receiving said integrally formed pivot pins on said tape lid and for allowing said pivot pins to rotate therein, (*e*) a spring means connected to said tape lid laterally outward of the said tape slot and said pivot pins, said spring means urging at least one of said vertical locating surfaces on said tape lid into operative engagement with said vertical locating surface on said plate, said spring means urging said pivot pins into operative engagement with said receiving means on said plate, and said spring means urging said tape lid to rotate to its open position, and (*f*) a biased latch for latching said tape lid against rotatable movement by said spring means, said latch means biasing said vertical locating surfaces on said tape lid into operative engagement with said vertical locating surface on said plate.

6. The tape utilization device of claim 5 wherein said horizontal locating surfaces on said tape lid is a locating projection and wherein said horizontal locating surface on said plate is the periphery of a slot in said plate.

7. The tape utilization device of claim 5 wherein the receiving means for said integrally formed pivot pin on said tape lid are depressed ears formed from said plate.

8. The tape utilization device of claim 5 wherein said horizontal locating means on said tape lid is the reference point from which said lands and slots are dimensioned in the lateral direction whereby when said horizontal locating surfaces on said plate and said tape lid are in operative locating engagement said lands and slots are also located relative to the plate and the tape borne thereon.

9. The tape utilization device of claim 5 wherein a feed wheel is provided for feeding the tape, said feed wheel having a plurality of feed pins thereon for insertion through feed holes in the tape, a portion of said plate is curved substantially about the axis of said feed wheel, a portion of said tape lid is curved substantially about the axis of said feed wheel; and, said vertical locating means accurately spaces said curved portion of said tape lid from said curved portion of said plate to provide a channel which directs the tape about said curved portion of said plate and over a plurality of said feed pins.

10. A tape lid for pivotal movement into operative engagement with a tape engaging plate of a tape utilization device, said tape engaging plate having horizontal and vertical locating surfaces thereon, said utilization device having a spring means for urging said tape lid for pivotal movement away from said plate and a biased latching means operable to hold said tape lid against pivotal movement by said spring means, said tape lid having a tape slot therein for guiding the tape and for holding the tape in engagement with said plate, said tape lid having (*a*) horizontal and vertical locating surfaces thereon for operative engagement with the horizontal and vertical locating surfaces on said plate for precisely locating the tape slot relative to the plate, (*b*) a pivot nest in said tape engaging plate, (*c*) pivot projections integrally formed on said tape lid for movement into pivotal relationship with said pivot nest to constitute a pivot means for said tape lid, (*d*) an edge on said vertical locating surface on said tape lid placed to allow said tape lid to pivot about said edge and bring said pivot projections into engagement with said pivot nest, (*e*) means on said tape lid spaced laterally of said pivot means and said tape slot and connected to said spring means for biasing said tape lid to move said pivot means into engagement with said pivot nest and for pivoting said tape lid upwardly from guiding relationship with said plate, and (*f*) a latching surface on said tape lid for engagement with said biased latching means to hold said tape lid against pivotal movement by said spring means and acting together with said spring to bias the vertical locating surfaces against each other to precisely locate said tape lid vertically relative to said plate.

References Cited in the file of this patent

UNITED STATES PATENTS

| | | |
|---|---|---|
| 2,422,310 | Nemeth | June 17, 1947 |
| 2,674,454 | Mennecke | Apr. 6, 1954 |